US007232224B2

(12) United States Patent
Penn

(10) Patent No.: US 7,232,224 B2
(45) Date of Patent: Jun. 19, 2007

(54) SIMULTANEOUS COLOR ILLUMINATION

(75) Inventor: Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 10/926,483

(22) Filed: Aug. 26, 2004

(65) Prior Publication Data

US 2006/0044520 A1    Mar. 2, 2006

(51) Int. Cl.
*G03B 21/28*    (2006.01)
*G02F 1/1335*   (2006.01)
*G02F 1/13357*  (2006.01)

(52) U.S. Cl. .......................... 353/31; 348/801; 349/69
(58) Field of Classification Search .................. 353/33, 353/7, 31, 29, 84, 122; 362/555; 349/69; 348/770, 771, 798–802
See application file for complete search history.

(56) References Cited

U.S. PATENT DOCUMENTS

| | | | |
|---|---|---|---|
| 5,537,258 A | | 7/1996 | Yamazaki et al. |
| 6,554,463 B2 * | | 4/2003 | Hooker et al. .............. 362/555 |
| 6,762,785 B2 * | | 7/2004 | Roddy et al. ............... 347/239 |
| 6,769,772 B2 | | 8/2004 | Roddy et al. |
| 6,773,112 B2 | | 8/2004 | Suzuki et al. |
| 6,802,613 B2 * | | 10/2004 | Agostinelli et al. ........... 353/31 |
| 6,956,701 B1 * | | 10/2005 | Peterson et al. ............ 359/618 |
| 2003/0117591 A1 | | 6/2003 | Stanton |
| 2004/0156090 A1 | | 8/2004 | Patel et al. |
| 2005/0190562 A1 * | | 9/2005 | Keuper et al. .............. 362/325 |

OTHER PUBLICATIONS

Harbers et al., "Performance of High Power LED Illuminators in Color Sequential Projection Displays," International Display Workshop, 4 pages, Dec. 2003.
Guizzo, "Coming Soon: Trillion-Color TV," IEEE Spectrum, 3 pages, Aug. 2004.
Steven M. Penn et al., Patent Pending Application entitled "Multiple Path Illumination for Image Display Systems,", 34 pages plus 3 pages of drawings, Aug. 26, 2004.

* cited by examiner

*Primary Examiner*—W. B. Perkey
*Assistant Examiner*—Andrew Sever
(74) *Attorney, Agent, or Firm*—Charles A. Brill; Wade James Brady, III; Frederick J. Telecky, Jr.

(57) ABSTRACT

According to one embodiment of the present invention, a method for color illumination for an image display system includes field sequentially operating an array of emitters to generate a sequence of light beams. Each light beam includes one color. A first light beam of a first color is combined with a second light beam of a second color. The first and second light beams are combined in an optical path to travel concurrently. The combination of the first and second light beams results in a composite color coordinate. The combination of the first and second light beams are directed at a spatial light modulator operable to receive the combination and produce a desired color on a display.

23 Claims, 3 Drawing Sheets

SIMULTANEOUS COLOR ILLUMINATION

TECHNICAL FIELD OF THE INVENTION

This invention relates in general to image display systems, and more particularly to optical systems implementing micro-mirror based projection display systems.

OVERVIEW

Spatial light modulators used in projection display systems are capable of projecting image details from media sources such as HDTV, DVD, and DVI. Conventional spatial light modulators are limited by their etendue, which dictates the energy available to the system. The amount of light within a particular wavelength range that may be accepted by the spatial light modulator is limited by the etendue of the system. Light originating from light sources emitting narrow bands of light are typically not powerful enough to enable the light modulators to generate a correctly colored or sufficiently bright image.

SUMMARY OF EXAMPLE EMBODIMENTS

In one embodiment, a method for color illumination for an image display system includes field sequentially operating an array of emitters to generate a sequence of light beams. Each light beam includes one color. A first light beam of a first color is combined with a second light beam of a second color. The first and second light beams are combined in an optical path to travel concurrently. The combination of the first and second light beams results in a composite color coordinate. The combination of the first and second light beams are directed at a spatial light modulator operable to receive the combination and produce a desired color on a display.

Depending on the specific features implemented, particular embodiments of the present invention may exhibit some, none, or all of the following technical advantages. Various embodiments may be capable of providing LED illumination to the spatial modulator. Accordingly, some embodiments may include LEDs to introduce light beams representing distinct color channels to the system's optical path. In some embodiments, the LEDs may be arranged such that the generated light beams may be filtered in order of highest pass frequency to lowest pass frequency, or vice versa. As a result, a less complicated filter design may be required. In other embodiments, it may be desirable to arrange the LEDs such that beams from the green LED pass through the least number of filters since the brightness of the system may be limited by the green wavelengths. Various embodiments may also be capable of producing light beams of different wavelength to create additional color channels without exceeding the etendue limits of the image display system. Other embodiments may be capable of altering the coordinates associated with a primary color to an optimum setting by producing a composite color coordinate. For example, an LED emitting cyan or amber may be operated simultaneously with the green LED to shift the color coordinates associated with green to a desired resultant green. In this matter, the light output of the etendue limited color channel associated with green may be increased. The green channel maybe operated at increased luminous flux levels.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
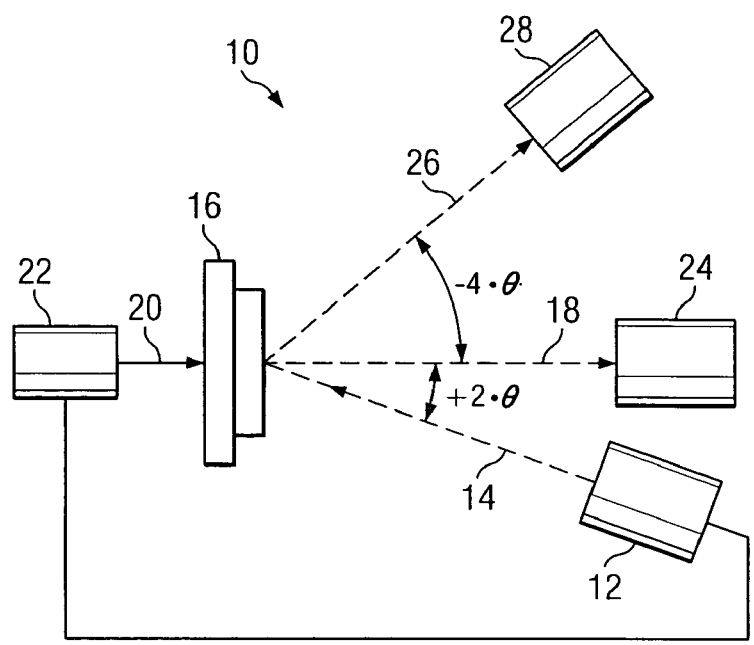
FIG. 1 is a block diagram of a portion of a projection display system in accordance with one embodiment of the present invention.

FIG. 1 is a block diagram of one embodiment of a portion of a projection display system 10. In this example, projection display system 10 includes a light source 12 capable of generating illumination light beams 14. Light beams 14 are directed at a modulator 16. Modulator 16 may comprise any device capable of selectively communicating at least some of the received light beams along a projection light path 18. In various embodiments, modulator 16 may comprise a spatial light modulator, such as, for example, a liquid crystal display or a light emitting diode modulator.

In this particular embodiment, modulator 16 comprises a digital micro-mirror device (DMD). The DMD is a micro electromechanical device comprising an array of hundreds of thousands of tilting micro-mirrors. In a flat state, each micro-mirror may be substantially parallel to projection lens 24. From the flat state, the micro-mirrors may be tilted, for example, to a positive or negative angle to alternate the micro-mirrors between an "on" state and an "off" state. For discussion purposes, the angle at which the mirrors may tilt will be measured from projection path 18 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides electrostatic forces, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

Light source 12 may comprise any light source, such as, for example, a metal halide light source, a xenon arc light source, an ultra-high-pressure (UHP) mercury vapor arc lamp, or other broadband light source. In particular embodiments, light source 12 includes an array of Light Emitting Diodes (LEDs), which generate narrow-band light. Unlike broadband light that must be filtered using a color wheel to separate the light into its red, green, and blue components, an array of LEDs may be used to generate "field sequential" images of red, blue, and green components. The differently colored images may be perceived by a viewer through projection lens 24 as a correctly colored image. LEDs are described in more detail below with regard to FIG. 2.

Where modulator 16 includes a plurality of tilting micro-mirror devices, a tilt on the order of approximately +10 to +12 degrees will result in light source 12 being in an "on" state. Conversely, a tilt on the order of approximately −10 to −12 degrees will result in light source 12 being in an "off" state. Although display system 10 is described and illustrated as including a single light source 12, it is generally recognized that display system 10 may include any suitable number of light sources appropriate for generating light beams for transmission to modulator 16.

In particular embodiments, light source 12 is positioned such that light beam 14 is directed at modulator 16 at an illumination angle of twice theta (where theta is equal to the degree of tilt of the micro-mirror devices in the "on" state). For example, where the micro-mirror devices tilt from approximately +10 to +12 degrees ("on") to approximately −10 to −12 degrees ("off"), light beam 14 may be directed at modulator 16 from light source 12 positioned at an angle of approximately +20 to +24 degrees from projection path 18. Accordingly, light beam 14 may strike modulator 16 at an angle of approximately +20 to +24 degrees relative to the normal of the micro-mirrors when the micro-mirrors are in a flat state or an untilted position.

When the micro-mirror elements of modulator 16 are in the "on" state direction, illumination beam 14 is reflected approximately normal to the surface of projection lens 24 along illumination path 18. When the micro-mirror elements of modulator 16 are tilted in the "off" state direction, illumination light beam 14 from light source 12 is reflected along off state light path 26 where it is received by light dump 28. Off state light path 26 is at a negative angle that is approximately equal to four times theta. Thus, where the micro-mirror devices are positioned at approximately −10 to −12 degrees when in the off state, light beam 14 is reflected at an angle of approximately −40 to −48 degrees as measured from projection path 18.

As discussed above, system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state. Accordingly, the micro-mirrors may be positioned at a tilt angle on the order of approximately +10 to +12 degrees, as measured from projection path 18. Alternatively, control module 22 may send image data 20 to modulator 16 that indicates that the micro-mirrors should be positioned in the "off" state. As such, the micro-mirrors may be positioned at a tilt angle on the order of approximately −10 to −12 degrees, as measured from projection path 18.

The energy available to display system 10 is defined by the etendue of modulator 16. The etendue dictates the optical invariant, which is the LED area multiplied by the solid angle of the light, available to light sources 12. Etendue can be defined by a product of the active area of modulator 16 with the sine-squared of the acceptance cone angle of modulator 16. For example, if modulator 16 has an active area of 100 mm$^2$ and an angle of acceptance of +24 degrees, the etendue of display system 10 approximately 16.5 mm$^2$ steradians. The etendue of display system 10 is fixed by modulator 16. Only those wavelengths of light emitted from a particular light source 12 within the etendue of display system 10 along the optical path are received at modulator 16. Furthermore, the amount of light within a particular wavelength range is also limited by the etendue of the system.

Figure 2:
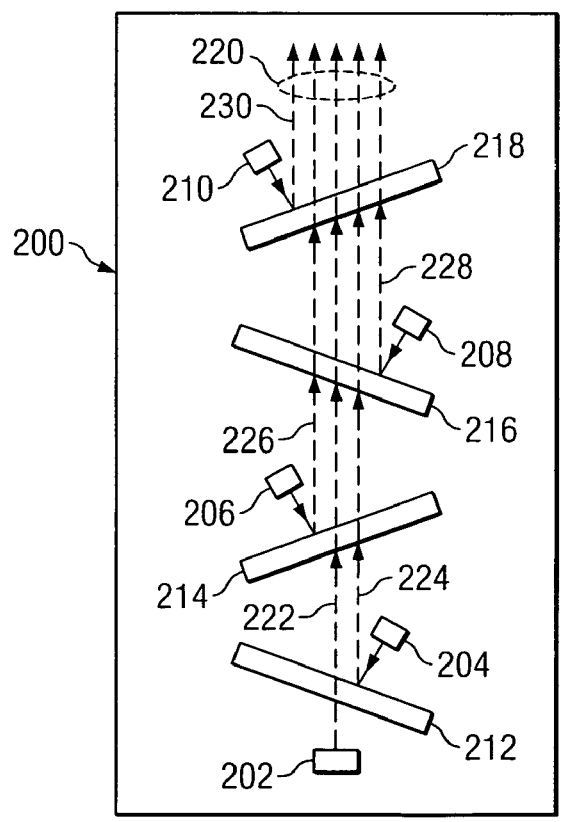
FIG. 2 is a block diagram of a light source in accordance with one embodiment of the present invention.

FIG. 2 is a block diagram of one embodiment of a light source 200. Light source 200 includes an array of light emitters 202–210 separated by filters 212–218. In particular embodiments, light emitters 202–210 may comprise Light Emitting Diodes (LEDs) configured to emit beams of narrow-band light of different colors. Although light emitters 202–210 will be described herein as including LEDs, it is recognized that light emitters 202–210 may comprise any other light source suitable for emitting beams of broad-band or narrow-band light. Furthermore, although each light emitter may be described as emitting beams of light within a defined range of wavelengths to produce desired bands of colors, some or all of light emitters 202–210 may be configured to emit beams of light within overlapping ranges of wavelengths or white light.

Typically, LEDs are configured to emit narrow-band beams of red, green, or blue light. The human eye, however, photopically requires more light within particular wavelength ranges to generate a correctly colored image. For example, more beams of green light may be required to produce a correctly colored image than may be accepted within the etendue of an image display system implementing an array of LEDs. Accordingly, a composite coordinate associated with the light generated by the LEDs may be desired to increase the intensity of light received within a particular wavelength range. The composite coordinate may be the result of two LED emitters of different wavelengths operating concurrently when the modulator demands a field sequential color spectrum.

As illustrated, light source 200 includes a blue LED 202, a cyan LED 204, a green LED 206, an amber LED 208, and a red LED 210. Each LED 202–210 is separated from neighboring LEDs by filters 212–218 designed to pass specific ranges of wavelengths and reflect other ranges of wavelengths. For example, in particular embodiments, blue LED 202 may be selected to emit blue light beams 222 of a wavelength on the order of 435–465 nanometers. Blue light beams 222 may be filtered at first filter 212 and introduced into optical path 220. Specifically, first filter 212 may be configured to pass blue light beams 222 and to reflect light beams of wavelengths outside this range. Accordingly, light of a wavelength higher than 470 nanometers may be reflected by first filter 212 and, thus, not allowed to pass into optical path 220. In particular embodiments, first filter 212 may be positioned such that it is tilted at an angle relative to optical path 220. For example, first filter 212 may be positioned such that first filter 212 is at an angle on the order of a +15 to +25 degrees, as measured from optical path 220. In particular embodiments, first filter 212 may be positioned at an angle on the order of +20 degrees. The orientation of first filter 212 may operate to minimize the angle of incidence (AOI) while maximizing the effectiveness and producibility of first filter 212. Although a lesser angle may be better for the design and efficiency of filter 212, mechanical packaging may influence the angle to avoid the interference of optical or mounting hardware with the generated light.

In particular embodiments, cyan LED 204 may be selected to emit cyan light beams 224 of a wavelength on the order of 470–520 nanometers. As illustrated, cyan LED 204 is positioned such that cyan beams 224 are directed at first filter 212. Where first filter 212 is configured to reflect any light of a wavelength higher than 470 nanometers, however, cyan beams 224 may be reflected from the surface of first filter 212. Accordingly, in various embodiments of light source 200, cyan beams 224 may be emitted from cyan LED 204 at an angle appropriate to result in the reflected cyan beams 224 being introduced into optical path 220. Cyan beams 224 and blue beams 222 may then be optically combined to travel concurrently in optical path 220 toward second filter 214.

Second filter 214 may operate to filter blue light beams 222 and cyan light beams 224. Specifically, second filter 214 may be configured to pass blue light beams 222 and cyan light beams 224. Additionally, second filter 214 may be configured to reflect light beams of wavelengths outside this range. Accordingly, light beams of a wavelength higher than 505 nanometers may be reflected by second filter 214 and, thus, not allowed to pass into optical path 220. In particular embodiments, second filter 214 may be positioned such that it is tilted at an angle relative to optical path 220. For example, second filter 214 may be positioned such that second filter 214 is at an angle on the order of a −15 to −25 degrees, as measured from optical path 220. In particular embodiments, second filter 214 may be positioned at an angle on the order of −20 degrees. The orientation of second filter 214 may operate to minimize AOI while maximizing the effectiveness and producibility of second filter 214.

In particular embodiments, green LED 206 may be selected to emit green light beams 226 of a wavelength on the order of 495–565 nanometers. As illustrated, green LED 206 is positioned such that green beams 226 are directed at second filter 214. Where second filter 214 is configured to reflect any light of a wavelength higher than 505 nanometers, however, green beams 226 may be reflected from the surface of second filter 214. Accordingly, in various embodiments of light source 200, green beams 226 may be emitted from green LED 206 at an angle appropriate to result in the reflected green beams 226 being introduced into optical path 220.

Third filter 216 may operate to filter blue light beams 222, cyan light beams 224, and green light beams 226. Specifically, third filter 216 may be configured to pass blue light beams 222, cyan light beams 224, and green light beams 226. Additionally, third filter 216 may be configured to reflect light beams of wavelengths outside this range. Accordingly, light of a wavelength higher than 590 nanometers may be reflected by third filter 216 and, thus, not allowed to pass into optical path 220. In particular embodiments, third filter 216 may be positioned such that it is tilted at an angle relative to optical path 220. For example, third filter 216 may be positioned such that, like first filter 212, third filter 216 is at an angle on the order of a +15 to +25 degrees, as measured from optical path 220. In particular embodiments, third filter 216 may be positioned at an angle on the order of +20 degrees. The orientation of third filter 214 may operate to minimize AOI while maximizing the effectiveness and producibility of third filter 216.

In particular embodiments, amber LED 208 may be selected to emit amber light beams 228 of a wavelength on the order of 580–610 nanometers. As illustrated, amber LED 208 is positioned such that amber beams 228 are directed at third filter 216. Where third filter 216 is configured to reflect any light of a wavelength higher than 590 nanometers, however, amber beams 228 may be reflected from the surface of third filter 216. Accordingly, in various embodiments of light source 200, amber beams 228 may be emitted from amber LED 208 at an angle appropriate to result in the reflected amber beams 228 being introduced into optical path 220.

Fourth filter 218 may operate to filter blue light beams 222, cyan light beams 224, green light beams 226, and amber light beams 228. Specifically, fourth filter 218 may be configured to pass blue light beams 222, cyan light beams 224, green light beams 226, and amber light beams 228. Additionally, fourth filter 218 may be configured to reflect light beams of wavelengths outside this range. Accordingly, light of a wavelength higher than 620 nanometers may be reflected by fourth filter 218 and, thus, not allowed to pass into optical path 220. In particular embodiments, fourth filter 218 may be positioned such that it is tilted at an angle relative to optical path 220. For example, fourth filter 218 may be positioned such that, like second filter 214, fourth filter 218 is at an angle on the order of a −15 to −25 degrees, as measured from optical path 220. In particular embodiments, fourth filter 218 may be positioned at an angle on the order of −20 degrees. The orientation of fourth filter 218 may operate to minimize AOI while maximizing the effectiveness and producibility of fourth filter 218.

In particular embodiments, red LED 210 may be selected to emit red light beams 230 of a wavelength on the order of 615–645 nanometers. As illustrated, red LED 210 is positioned such that red beams 230 are directed at fourth filter 218. Where fourth filter 218 is configured to reflect any light of a wavelength higher than 620 nanometers, however, red beams 230 may be reflected from the surface of fourth filter 218. Accordingly, in various embodiments of light source 200, red beams 230 may be emitted from red LED 210 at an angle appropriate to result in the reflected red beams 230 being introduced into optical path 220. Red beams 230 and amber beams 228 may then be optically combined and travel concurrently in optical path 220 toward modulator 16.

Figure 4:
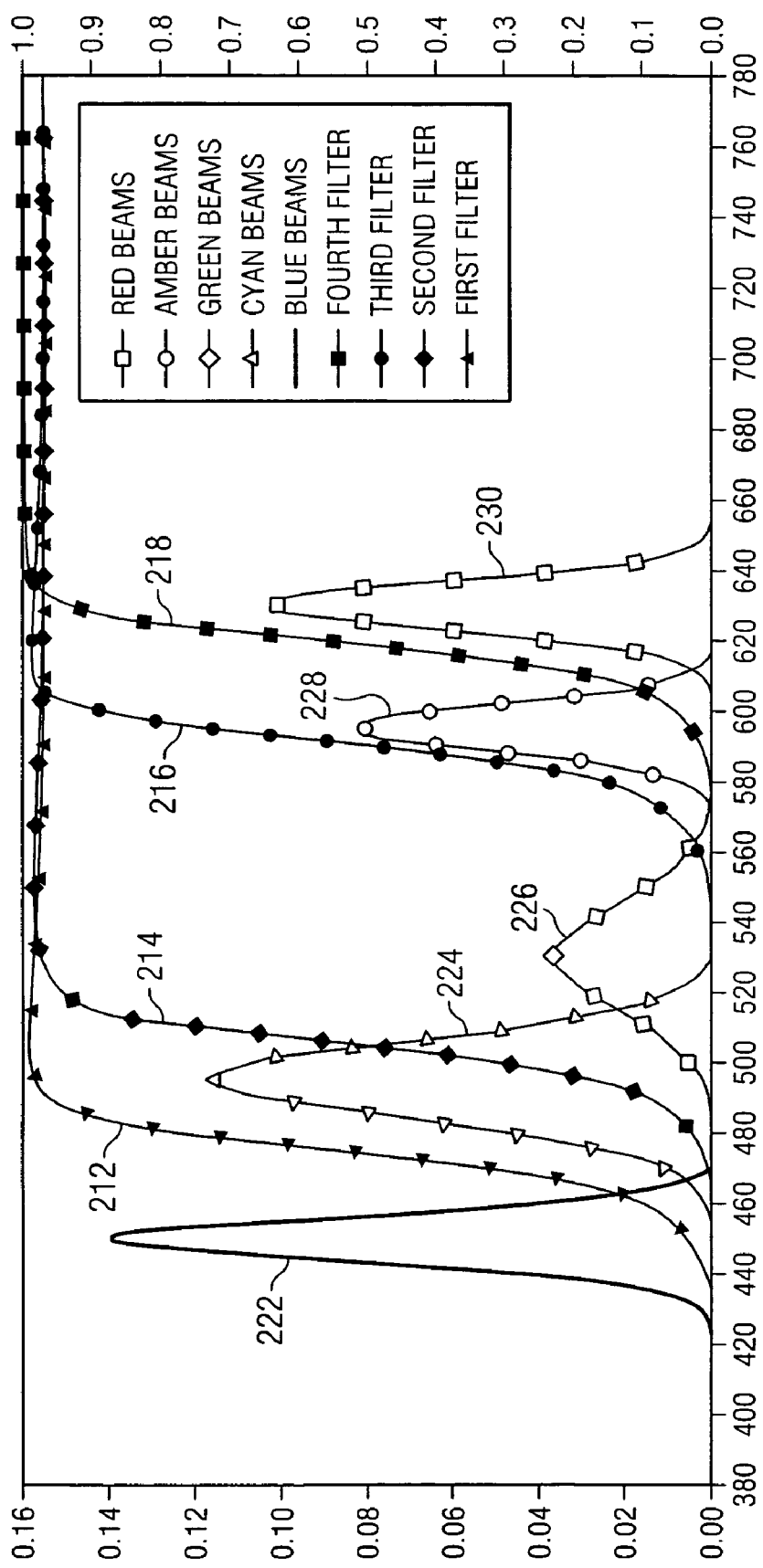
FIG. 4 is a graph illustrating a configuration of light emitting diodes and filters for an exemplary light source in accordance with one embodiment of the present invention.

In the example embodiment described above, light beams 222–230 that are added to optical path 220 are associated with successively increasing wavelengths. Accordingly, the filters are arranged in the order of highest pass frequency (blue) to lowest pass frequency (red). Thus, first filter 212 is configured to pass blue light beams 222 and reflect all others. Similarly, second filter 214 is configured to pass blue light beams 222 and cyan light beams 224, while reflecting all others. Third filter 216 and fourth filter 218 are configured accordingly. The described configuration of LEDs and filters is illustrated in FIG. 4. FIG. 4 depicts the example wavelengths provided above as relating to LEDs 202–210. FIG. 4 also illustrates that filters 212–218 may not actually reflect all light or pass all light at the specified wavelengths. Rather, the cut-off for each filter 212–218 is represented by a slope. Accordingly, the above description which describes filters 212–218 as reflecting all light at 470, 505, 590, and 620 nanometers, respectively, merely represents an example situation for ideal filters.

Furthermore, it is recognized that LEDS 202–210 need not be arranged such that light beams 222–230 are added to optical path 220 in successively increasing wavelengths. Accordingly, filters 212–218 also need not be arranged in the order of highest pass frequency (blue) to lowest pass frequency (red). For example, LEDs 202–210 may be arranged in order of successively decreasing frequency or in any other suitable order. Filters 212–218 would then be designed to pass and reflect the appropriate wavelengths of light taking into account the ordering of LEDs 202–210. In particular embodiments, it may be desirable to arrange the LEDs such that light beams from a green LED pass through the least number of filters since the brightness of the system may be limited by the green wavelengths. Where filters 212–218 are not ordered from highest pass frequency to lowest pass frequency, or vice versa, however, a more complicated design of filters 212–218 may be required.

The number of LEDs 202–210 and the selection of colors emitted by LEDs 202–210 are merely examples. Any number of LEDs 202–210 may be selected to emit appropriate beams of light in the desired wavelength ranges suitable for image display system 10. Because the human eye photopically requires more light within particular wavelength ranges to generate a correctly colored image, however, LEDs 202–210 and filters 212–218 may be selectively configured to create additional color channels that may be added to the existing color channels without exceeding the etendue limits of image display system 10. The combination of the additional colors with the standard colors offered by LEDs may result in a composite color coordinate associated with the LEDs. For example, amber LED 208 may be operated simultaneously with green LED 206 to result in a composite color coordinate at an optimum setting. As another example, cyan LED 204 may be operated simultaneously with the blue LED 202 to result in a composite color coordinate at an optimum setting. As still another example, amber LED 208 may be operated simultaneously with the red LED 210 to result in a composite color coordinate at an optimum setting. In this manner, the light output of the etendue limited color channels associated with blue or red may also be increased. Combining the LEDs as described allows more energy to be produced from the combined or composite wavelengths and summed optical area. The color channels may be allowed to operate at proportionally increased luminous flux levels.

As described above with regard to FIG. 1, light source 12 within image display system 10 communicates with control module 22 or another controller. In various embodiments, control module 22 may operate to control the transmission of light beams 222–230 from LEDs 202–210, respectively. In operation, control module 22 may control the cycle and rate of light beams 212–230 that are emitted from each LED 202–210. The alternation of illumination between LEDs 202–210 may be timed on a high frequency, bit-by-bit basis. For example, control module 22 may alternate the operation of LEDs 202–210 to result in light beams 222–230 being emitted at intervals suitable for generating a desired image to be displayed by image display system 10. In particular embodiments, control module 22 may alternate the emission of light beams 222–230 from LEDs 202–210, respectively, within a single frame. Accordingly, each LED 202–210 within a light source 200 may be used during some portion of a 60 Hertz frame to display the appropriate colors to modulator 16. Because LEDs may be operated at extremely fast rates, light beams 222–230 may be alternated at sub-microsecond intervals. The high-speed alternation of light beams 222–230 within light source 200 in image display system 10 allows image display system 10 to handle complex image sequences.

Figure 3:
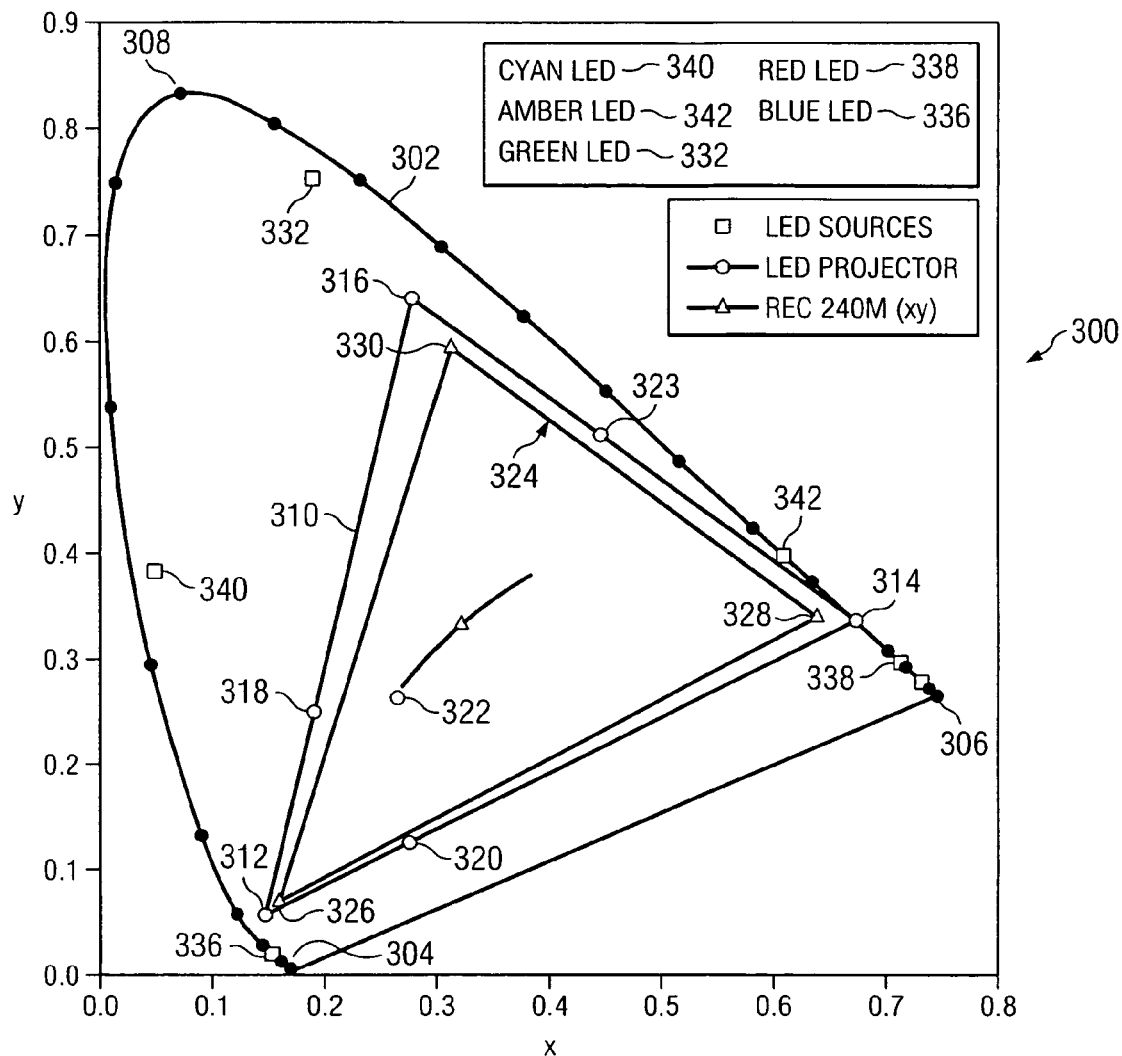
FIG. 3 is a color triangle that illustrates one example for altering color coordinates in accordance with one embodiment of the present invention.

FIG. 3 is a color gamut 300 that illustrates one example for altering color coordinates in accordance with one embodiment of the present invention. In this example, color gamut 300 includes an outer gamut 302 that represents the color Spectrum Locus. The colors included in outer gamut 302 are fully saturated and represent the color perception limits of the eye. Outer gamut 302 has three vertices that represent the primary color components of blue 304, red 306, and green 308 in their respective saturated states.

Color gamut 300 also includes an intermediary gamut 310, which represents the spectrum of colors recommended for a premium quality monitor or consumer television. Gamut 310 is a subset of gamut 302 and also has three vertices that represent the primary color components of blue 312, red 314, and green 316. Gamut 310 also includes points representing secondary colors of cyan 318, magenta 320, yellow 323, and white 322. The LEDs and modulator may be operated in coordination to provide the color coordinates for gamut 310 and are summarized below:

|  | X-Coordinate | Y-Coordinate | Lumens |
|---|---|---|---|
| Red 314 | 0.6622 | 0.3357 | 47.10 |
| Green 316 | 0.2742 | 0.6425 | 127.84 |
| Blue 312 | 0.1428 | 0.0570 | 24.29 |
| Magenta 320 | 0.2715 | 0.1259 | 71.24 |
| Yellow 323 | 0.4409 | 0.5117 | 179.56 |
| Cyan 318 | 0.1730 | 0.2510 | 171.23 |
| White 322 | 0.2616 | 0.2673 | 222.95 |

Color gamut 300 also includes an inner gamut 324 that represents the colors recommended by the Society of Motion Pictures and Television Engineers (SMPTE). Inner gamut 324 is also a subset of outer gamut 302 and includes three vertices representing the primary color components of blue 326, red 328, and green 330.

As described above, particular embodiments of the present invention may utilize LEDs to generate green, blue, and red light beams that have the coordinates associated with green 332, blue vertex 336, and red vertex 338, respectively. As described above with regard to FIG. 2, the LEDs may be configured and filtered to create additional color channels without exceeding the etendue limits of image display system 10. Accordingly, LEDs or other light emitters may also be used to generate colors associated with cyan 340 and amber 342. The combination of the additional secondary colors with the standard primary colors offered by LEDs may result in a shift of the color coordinates associated with the primary colors. For example, amber LED 342 may be simultaneously operated with green LED 332 to result in a composite color coordinate at an optimum setting which is represented at adjusted green 316. In this manner, the light output of the etendue limited color channel associated with green may be increased, and the green channel may be allowed to operate at proportionally increased luminous flux levels. The combinations of colors also reduces the demand for electrical current to each LED and reduces the heat dissipated from each array of LEDs.

In other embodiments, amber LED 342 may be simultaneously operated with red LED 338 to result in a composite color coordinate at an optimum setting, which is represented at adjusted red 314. In this manner, the light output of the etendue limited color channels associated with red may be increased. The addition of a secondary colors such as amber 342 and/or cyan 340 to the primary colors of green 332, red 338, and/or blue 336 enables the summation of the intensity of all colors that are emitted at the same time.

Figure 5:
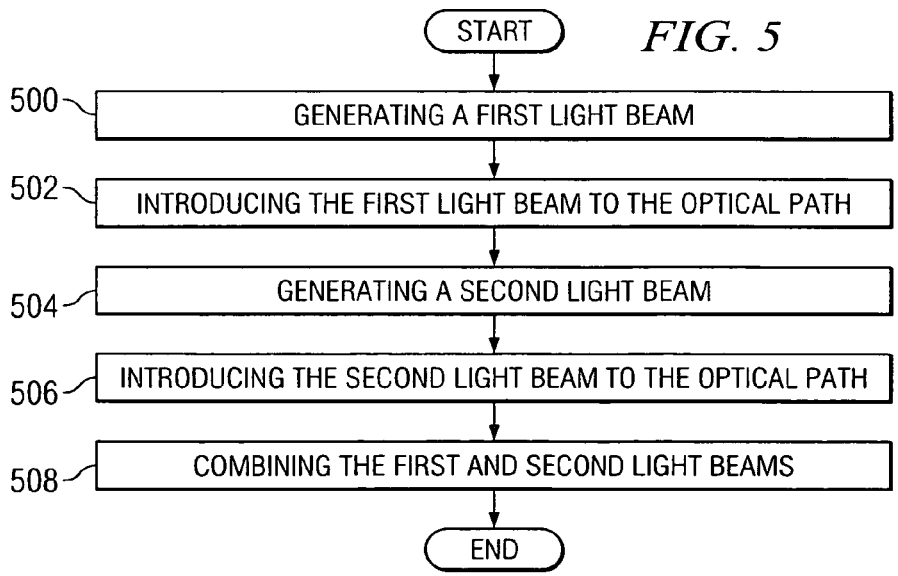
FIG. 5 is a flow chart of a method for projecting light in accordance with one embodiment of the present invention.

FIG. 5 is a flow chart of a method for projecting light in accordance with one embodiment of the present invention. At step 500, a first light beam is generated. In particular embodiments, the first light beam may comprise a beam of blue, red, or green light emitted from a narrow-band emitter such as LED. Thus, the first light beam may be associated with a first primary color coordinate on color gamut 300. For example, the light beam may be a primary light beam such as blue light beam 222, green light beam 226, or red light beam 230.

At step 502, the first light beam is introduced into an optical path. In particular embodiments, introducing the first light beam into the optical path may include directing the first light beam at a filter selected to pass particular wavelengths of light and reflect other wavelengths of light. For example, the first light beam may comprise green light beam 226 directed at a filter, such as second filter 214, which is selected to reflect wavelengths of green light 226. Alternatively, the first light beam may directed at a filter configured to pass wavelengths of green light 226.

At step 504, a second light beam is generated. In particular embodiments, the second light beam may be selected to create an additional color channel to add to the existing color channel associated with the first light beam. The wavelengths associated with the first and second light beams may be sufficiently different such that the additional color channel may be summed with to the existing color channels without exceeding the etendue limits of image display system 10. In particular embodiments, the second light beam may comprise a beam of cyan or amber emitted from a narrow-band emitter such as an LED. For example, the light beam may be a secondary light beam such as cyan light beam 224 or amber light beam 228. The second light beam may be associated with a second color coordinate on a color gamut.

At step 506, the second light beam is introduced into the optical path. In particular embodiments, introducing the second light beam into the optical path may include directing the second light beam at a filter selected to pass particular wavelengths of light and reflect other wavelengths of light. For example, the second light beam may comprise cyan light beam 224 directed at a filter, such as first filter 212, which is selected to reflect wavelengths of cyan light 224. Thus, the filter may be positioned at an orientation appropriate for the reflection of the second light beam into the optical path. Alternatively, the light beam may be transmitted normal to a filter, which is configured to pass wavelengths of cyan light 224.

At step 508, the first and second beams of light are combined in the optical path. The first and second light beams may travel concurrently in the optical path. In various embodiments, the first light beam is associated with a color coordinate defining a first channel in the optical path. The second light beam is similarly associated with a second color coordinate defining a second channel in the optical path. The second light beam may be selectively chosen to provide a second color channel to the optical path without exceeding the etendue limits of image display system 10. Accordingly, the first and second light beams may be summed in the optical path for transmission to modulator 16. The introduction of the second light beam may result in a composite color coordinate on the color gamut. Thus, the second light beam may result in an increase in the amplitude of the summed light in the optical path.

In particular embodiments, the first and second light beams may be pass through additional filters, such as third filter 216 and fourth filter 218, before being transmitted to modulator 16. The additional filters may be designed to pass light beams in particular wavelength ranges and to reflect light beams in other wavelength ranges. The additional filters may be configured to operate to introduce additional light beams of different wavelengths into the optical path. The additional light beams may be introduced prior to the introduction of the first and second light beams. Alternatively, the additional light beams may be introduced after the introduction of the first and second light beams. Finally, it is also recognized that the one or more additional light beams may comprise intermediary light beams that are introduced after the introduction of the first light beam but before the introduction of the second light beam. Regardless of when the additional light beams are introduced into the optical path, the additional light beams create additional color channels that may be summed with the color channels represented by the first and second light beams. Because each light beam in the optical path represents a discrete channel, however, the light beams may exist simultaneously in the optical path without exceeding the etendue limits of image display system 10.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for color illumination for an image display system comprising a spatial light modulator that has a corresponding etendue limit, comprising:
   field sequentially operating an array of emitters to generate a sequence of light beams, each light beam comprising one color;
   combining a first light beam of a first color with a second light beam of a second color, the first and second light beams combined in an optical path to travel concurrently, the combination of the first and second light beams resulting in a composite color coordinate and without exceeding the etendue limit; and
   directing the combination of the first and second light beams at the spatial light modulator, said modulator operable to receive the combination and produce a desired color on a display.

2. The method of claim 1, wherein the second color has a color spectrum with a peak intensity that is spectrally adjacent to the peak intensity of the first color of the first light beam.

3. The method of claim 2, wherein:
   generating the first light beam comprises emitting a green light beam from a first LED; and
   generating the second light beam comprises emitting a amber light beam from a second LED.

4. The method of claim 2, wherein:
   generating the first light beam comprises emitting a blue light beam from a first LED; and
   generating the second light beam comprises emitting a cyan light beam from a second LED.

5. The method of claim 2, wherein:
   generating the first light beam comprises emitting a red light beam from a first LED; and
   generating the second light beam comprises emitting an amber light beam from a second LED.

6. The method of claim 2, further comprising:
   generating a third, light beam of a third color; and
   introducing the third light beam into the optical path.

7. The method of claim 6, wherein:
operating an array of emitters comprises:
operating a first emitter to generate the first light beam;
operating a second emitter to generate the second light beam; and
operating a third emitter to generate the third light beam;
combining the second light beam with the first light beam comprises selecting a first filter to separate the first emitter from the second emitter, the first filter positioned at an angle on the order of +18 to +22 degrees from the optical path; and
introducing the third light beam into the optical path comprises selecting a second filter to separate the third emitter from at least one of the first and second emitters, the second filter positioned at an angle on the order of −15 to −25 degrees from the optical path.

8. The method of claim 1, wherein:
operating an array of emitters comprises:
operating a first emitter to generate the first light beam; and
operating a second emitter to generate the second light beam; and
combining the first light beam with the second light beam comprises selecting a filter to separate the first emitter from the second emitter.

9. The method of claim 8, wherein the filter is configured to pass at least one of the first and second light beams and reflect at least one of the first and second light beams.

10. The method of claim 9, wherein the second light beam is of a lower wavelength than the first light beam, the filter configured to pass the second light beam and reflect the first light beam.

11. The method of claim 8, further comprising positioning the filter at an angle on the order of +15 to +25 degrees from the optical path.

12. A system of color illumination for an image display system, comprising:
an array of emitters operable to generate a sequence of light beams, each light beam comprising one color, the array of emitters comprising:
a first light emitter operable to:
generate a first light beam of a first color; and
introduce the first light beam into an optical path;
a second light emitter operable to:
generate a second light beam of a second color; and
introduce the second light beam into the optical path;
a first filter configured to combine the first light beam with the second light beam in the optical path, the combination of the first and second light beams resulting in a composite color coordinate; and
a spatial light modulator that has a corresponding etendue limit and is operable to:
receive the first and second light beams transmitted concurrently in the optical path, wherein the first and second light beams transmitted concurrently do not exceed the etendue limit; and
produce a desired color on a display.

13. The system of claim 12, wherein the second color has a color spectrum with a peak intensity that is spectrally adjacent to the peak intensity of the first color of the first light beam.

14. The system of claim 12, wherein the first filter is configured to pass at least one of the first and second light beams and reflect at least one of the first and second light beams.

15. The system of claim 14, wherein the second light beam is of a lower wavelength than the first light beam, the first filter configured to pass the second light beam and reflect the first light beam.

16. The system of claim 12, wherein the first filter is positioned at an angle on the order of +15 to +25 degrees from the optical path.

17. The system of claim 12, wherein:
the first emitter comprises a first LED operable to emit a green light beam; and
the second emitter comprises a second LED operable to emit a amber light beam.

18. The system of claim 12, wherein:
the first emitter comprises a first LED operable to emit a blue light beam; and
the second emitter comprises a second LED operable to emit a cyan light beam.

19. The system of claim 12, wherein:
the first emitter comprises a first LED operable to emit a red light beam; and
the second emitter comprises a second LED operable to emit an amber light beam.

20. The system of claim 12, further comprising:
a third emitter operable to:
generate a third light beam of a third color; and
introduce the third light beam into the optical path.

21. The system of claim 20, wherein:
the first filter separates the first emitter from the second emitter, the first filter positioned at an angle on the order of +15 to +25 degrees from the optical path; and
the second filter separates the third emitter from at least one of the first and second emitters, the second filter positioned at an angle on the order of −15 to −25 degrees from the optical path.

22. A method for color illumination for an image display system, comprising:
field sequentially operating an array of emitters to generate a sequence of light beams, each light beam comprising one of a first three colors;
on demand combining a first light beam of a first color with a second light beam of a second color, the second color having a color spectrum with a peak intensity that is spectrally adjacent to a peak intensity of the first color of the first light beam, the first and second light beams combined in an optical path to travel concurrently, the combination of the first and second light beams resulting in a composite color coordinate; and
directing the combination of the first and second light beams at a spatial light modulator operable to receive the combination and produce a desired color on a display, wherein the spatial light modulator has a corresponding etendue limit and the combination not exceeding the etendue limit.

23. A system of color illumination for an image display system, comprising:
an array of emitters operable to field sequentially generate a sequence of light beams, each light beam comprising one of a first three colors, the array of emitters comprising:
a first light emitter operable to:
generate a first light beam of a first color; and
introduce the first light beam into an optical path;
a second light emitter operable to:
generate a second light beam of a second color; and
introduce the second light beam into the optical path;
a first filter configured to combine the first light beam with the second light beam in the optical path on demand, the second color having a color spectrum with a peak intensity that is spectrally adjacent to a peak intensity of the first color of the first light beam, the combination of the first and second light beams resulting in a composite color coordinate; and a spatial light modulator that has a corresponding etendue limit and is operable to:

receive the first and second light beams transmitted concurrently in the optical path, wherein the first and second light beams do not exceed the etendue limit; and produce a desired color on a display.

* * * * *